(12) United States Patent
Black et al.

(10) Patent No.: US 10,547,176 B2
(45) Date of Patent: *Jan. 28, 2020

(54) METHOD AND SYSTEM FOR USING DEMAND SIDE RESOURCES TO PROVIDE FREQUENCY REGULATION USING A DYNAMIC ALLOCATION OF ENERGY RESOURCES

(71) Applicant: Battelle Memorial Institute, Columbus, OH (US)

(72) Inventors: Jason W. Black, Dublin, OH (US); Jason J. McCullough, Columbus, OH (US); Eric Rehberg, Westerville, OH (US); James E. Dvorsky, Plain City, OH (US); Seyed A. Mansouri, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/688,360

(22) Filed: Aug. 28, 2017

(65) Prior Publication Data

US 2017/0358924 A1 Dec. 14, 2017

Related U.S. Application Data

(63) Continuation of application No. 14/436,000, filed as application No. PCT/US2013/073632 on Dec. 6, 2013, now Pat. No. 9,748,770.

(Continued)

(51) Int. Cl.
*H02J 3/14* (2006.01)
*H02J 13/00* (2006.01)
(Continued)

(52) U.S. Cl.
CPC ................ *H02J 3/14* (2013.01); *G05B 15/02* (2013.01); *H02J 3/00* (2013.01); *H02J 4/00* (2013.01);
(Continued)

(58) Field of Classification Search
CPC .... H02J 3/14; H02J 3/00; H02J 13/002; H02J 13/0075; H02J 13/0006; H02J 13/0062;
(Continued)

(56) References Cited

U.S. PATENT DOCUMENTS 5,754,033 A 5/1998 Thomson
7,127,327 B1 10/2006 O'Donnell et al.
(Continued)

OTHER PUBLICATIONS

International Search Report and Written Opinion for PCT Serial No. PCT/US2013/073632.

*Primary Examiner* — Ziaul Karim
(74) *Attorney, Agent, or Firm* — Fay Sharpe LLP (57) ABSTRACT

In a direct load control system supporting frequency control of an electrical grid, at each electrical load of an aggregation of loads, a load status report is generated comprising an urgency value and a power level. At an aggregation dispatch controller, a dispatch signal is generated based on the generated load status reports and information indicative of electrical frequency. At each electrical load of the aggregation, the load is operated at the reported power level if the reported urgency value satisfies the dispatch signal and is not operated at the reported power level if the reported urgency value does not satisfy the dispatch signal.

27 Claims, 3 Drawing Sheets

Related U.S. Application Data (60) Provisional application No. 61/789,169, filed on Mar. 15, 2013, provisional application No. 61/734,537, filed on Dec. 7, 2012.

(51) Int. Cl.
*H02J 4/00* (2006.01)
*G05B 15/02* (2006.01)
*H02J 3/00* (2006.01)

(52) U.S. Cl.
CPC ........ *H02J 13/002* (2013.01); *H02J 13/0006* (2013.01); *H02J 13/0062* (2013.01); *H02J 13/0075* (2013.01); *Y02B 70/3225* (2013.01); *Y02B 90/2615* (2013.01); *Y02B 90/2638* (2013.01); *Y02B 90/2653* (2013.01); *Y04S 20/222* (2013.01); *Y04S 40/121* (2013.01); *Y04S 40/124* (2013.01); *Y04S 40/126* (2013.01)

(58) Field of Classification Search
CPC .......... H02J 4/00; G05B 15/02; Y04S 40/121; Y04S 40/124; Y04S 40/126; Y04S 20/222; Y02B 90/2638; Y02B 90/2653; Y02B 90/2615; Y02B 70/3225
USPC .................................................. 700/287–297
See application file for complete search history.

(56) References Cited

U.S. PATENT DOCUMENTS

| | | | |
|---|---|---|---|
| 2002/0019758 A1* | 2/2002 | Scarpelli | G06Q 10/06 705/26.2 |
| 2010/0019574 A1 | 1/2010 | Baldassarre | |
| 2010/0070103 A1 | 3/2010 | Fleck et al. | |
| 2010/0314942 A1* | 12/2010 | Talkin | G06Q 50/06 307/41 |
| 2011/0029147 A1 | 2/2011 | Sun et al. | |
| 2012/0135725 A1* | 5/2012 | Pinder | H04W 76/40 455/422.1 |
| 2012/0153725 A1 | 6/2012 | Grohman | |
| 2013/0346768 A1 | 12/2013 | Forbes, Jr. | |
| 2014/0018969 A1 | 1/2014 | Forbes, Jr. | |

* cited by examiner

METHOD AND SYSTEM FOR USING DEMAND SIDE RESOURCES TO PROVIDE FREQUENCY REGULATION USING A DYNAMIC ALLOCATION OF ENERGY RESOURCES

This application is a continuation of U.S. Pat. No. 9,748,770, filed Apr. 15, 2015 titled "Using Demand Side Resources to Provide Frequency Regulation", which claims the benefit of U.S. Provisional Application No. 61/734,537 filed Dec. 7, 2012 titled "Method and System for Using Demand Side Resources to Provide Frequency Regulation Using a Dynamic Allocation of Energy Resources". This application also claims the benefit of U.S. Provisional Application No. 61/789,169 filed Mar. 15, 2013 titled "Method and System for Using Demand Side Resources to Provide Frequency Regulation Using a Dynamic Allocation of Energy Resources".

U.S. Provisional Application No. 61/734,537 filed Dec. 7, 2012 titled "Method and System for Using Demand Side Resources to Provide Frequency Regulation Using a Dynamic Allocation of Energy Resources" is incorporated herein by reference in its entirety. U.S. Provisional Application No. 61/789,169 filed Mar. 15, 2013 titled "Method and System for Using Demand Side Resources to Provide Frequency Regulation Using a Dynamic Allocation of Energy Resources" is incorporated herein by reference in its entirety.

BACKGROUND

The following relates to the electrical power grid arts, electrical power grid frequency control arts, and related arts.

Electrical power grid management includes maintenance of the target electrical frequency, e.g. at 60 Hz (in North America) or 50 Hz (in Europe). Electrical power generators are designed to operate at (by way of illustrative example) 60 Hz at a given load. If the load increases, this creates counter-torque on the generators which slows the mechanical rotation and consequently lowers the electrical frequency. Conversely, if the load decreases, the counter-torque is reduced, the mechanical rotation speed increases and consequently the electrical frequency increases.

In practice, the electrical frequency is measured in real-time to generate an Automatic Generation Control (AGC) signal. Based on the AGC signal, ancillary generators (typically gas-fired for rapid response) are throttled up or down to maintain the target electrical frequency. Rather than ancillary generators, energy storage devices such as batteries or flywheels can be used to absorb or inject power to maintain frequency. The ancillary generators (and/or batteries, flywheels, et cetera) are property of the power company and/or property of curtailment service providers (CSPs). In the former case, construction and maintenance of these frequency control devices is a direct cost to the utility company or other grid operator. In the latter case, the grid operator typically contracts with the CSP to obtain access to the ancillary generator for a prescribed time interval. In either case, scheduling of sufficient ancillary generator capacity typically done ahead of time, while the actual frequency control is done using the ancillary generators based on the AGC signal, typically with a response time of minutes to tens of minutes for throttle-up or throttle-down of the ancillary generators.

The requirement to maintain sufficient ancillary generator capacity available for frequency control introduces substantial overhead cost and energy waste to the power grid. Overhead cost arises due to the need to construct and maintain the ancillary generators, and/or the cost of contracting with CSPs for access to these devices. These costs can be reduced by improved aggregate load prediction or modeling; however, the grid operator still must plan for unexpected load swings due to weather changes, social events, unexpected industrial loads, and so forth. Energy waste arises due to operational inefficiencies of the ancillary generators (or batteries, flywheels, et cetera).

One approach that has been contemplated to reduce the need for ancillary generators or the like is to construct loads to perform frequency response. Such "frequency response loads" are designed to detect the a.c. line frequency and to increase power usage (at least on average) when the frequency goes above the target frequency and to decrease power usage when the frequency goes below the target frequency. Frequency response loads can in principle improve frequency regulation, but the decentralized nature of this approach limits its usefulness. The grid operator does not control the frequency response loads, and so cannot rely upon these loads to maintain the target frequency. Accordingly, frequency control performed by the grid operator dominates, and the frequency response loads typically can, at most, provide secondary "fine tuning" of the electrical frequency. (Indeed, it is possible that a high density of frequency response loads may actually be detrimental, if the load modeling employed by the grid operator does not take these loads into account).

Another approach that has been contemplated to reduce the need for ancillary generators or the like is Direct Load Control (DLC). In this approach, the grid operator directly controls load operation. By utilizing loads that have an energy storage and/or time lag facet, DLC can in principle provide a mechanism for frequency control. For example, heating, ventilation, and air conditioning (HVAC) systems have high thermal capacity due to the thermal capacity of the heated air volume. Similarly, hot water tanks have thermal capacity in the form of the stored hot water. Using DLC, the grid operator can operate such loads in a manner that minimizes frequency fluctuations while still maintaining the desired room temperature, water temperature, or so forth.

BRIEF SUMMARY

In some illustrative embodiments disclosed as illustrative examples herein, a method comprises: at each electrical load of an aggregation of loads, generating a load status report comprising an urgency value and a power level; at an aggregation dispatch controller, generating a dispatch signal based on the generated load status reports and information indicative of electrical frequency; and at each electrical load of the aggregation, operating the load at the reported power level if the reported urgency value satisfies the dispatch signal and not operating the load at the reported power level if the reported urgency value does not satisfy the dispatch signal.

In some illustrative embodiments disclosed as illustrative examples herein, a dispatch controller is configured to generate a dispatch signal based on information indicative of electrical frequency and based on load status reports received from an aggregation of electrical loads wherein each load status report comprises an urgency value and a power level, and transmit the generated dispatch signal to the electrical loads of the population. Each load of the aggregation is configured to generate a load status report comprising an urgency value and a power level, transmit the load status report to the dispatch controller, receive the dispatch signal from the dispatch controller, and operate at the reported power level if the urgency value satisfies the received dispatch signal and not operate at the reported power level if the urgency value does not satisfy the received dispatch signal.

DETAILED DESCRIPTION

Disclosed herein are approaches for control of loads that balances the objectives of providing power grid frequency control, on the one hand, and efficiently operating the individual loads, on the other hand. These objectives are not necessarily in concert. For example, when the grid is in an under-frequency condition the grid operator may wish to reduce the power draw of the loads; however, if the stored water temperature in a hot water tank is approaching its low temperature threshold then power must be drawn immediately to maintain water temperature. Conversely, if the grid is in an over-frequency condition and needs additional load, but the stored water temperature in a hot water tank is approaching its high temperature threshold, then power that hot water tank may not draw any heating power at that time.

In the case of large industrial loads under DLC, it may be feasible to provide individualized DLC control for each load that balances the potentially contradictory objectives of grid frequency control and efficient load operation. However, if DLC-based frequency control is to be expanded to the residential and smaller commercial markets, that is, to employ residential loads such as residential hot water heaters, house or apartment HVAC systems, and so forth, then centralized individual load control may be difficult or impossible due to the large number of devices. Frequency response approaches in which each load operates individually to augment grid-level frequency control can provide a better balance of frequency control versus efficient device operation, but as already noted frequency response has deficiencies of its own.

Disclosed herein is an approach for aggregate frequency control that is readily applied to large load populations (i.e. aggregations) such as are likely to be encountered in incorporating commercial and residential loads into the system. The approach balances the potentially contradictory objectives of grid frequency control and efficient load operation by employing a dispatch signal for an aggregate device population but implementing that dispatch signal at the load level based on a load status reported by the load. These load status reports are conveyed from the loads to an aggregator dispatch controller so that the dispatch signal delivered to the loads can take into account statistics of the loads in the aggregation in constructing the dispatch signal. This disclosed approach allows the grid operator to rely on the aggregation to provide a designated frequency control capacity, while still allowing individualized control at the load level to constrain participation of particular loads at any given dispatch period.

The disclosed approach comprises a system including an aggregation of electricity consuming devices (i.e., electrical loads) with communications capability, along with an aggregation dispatch controller. The aggregate load is adjusted based on a dispatch signal generated by the dispatch controller in accordance with an Automatic Generation Control (AGC) provided by the grid operator. The dispatch signal is computed based on the AGC signal and further based on aggregate statistics of the load status reports provided by the loads of the aggregation. The system may be distinct from the grid operator, for example contracted by the grid operator to provide a designated load capacity for use in frequency control. Alternatively, the system can be owned and operated by the grid operator itself. In order to ensure that the loads, operating in the aggregate, provide the desired frequency control contribution, they are first scheduled for a baseline consumption level. Devices then turn off/on in accordance with the dispatch signal (possibly with a statistically insignificant number of exceptions), so that the aggregate load is adjusted to meet the dispatch signal. That dispatch signal is adjusted by the aggregation dispatch controller based on the AGC signal and the statistics of the load status reports received from the loads of the aggregation. At the load level, the devices are prioritized so that the scheduling and dispatch maximize consumer comfort and load operational efficiency. The loads provide load status reports, that is, real time status and availability, to the aggregation dispatch controller.

Figure 1:
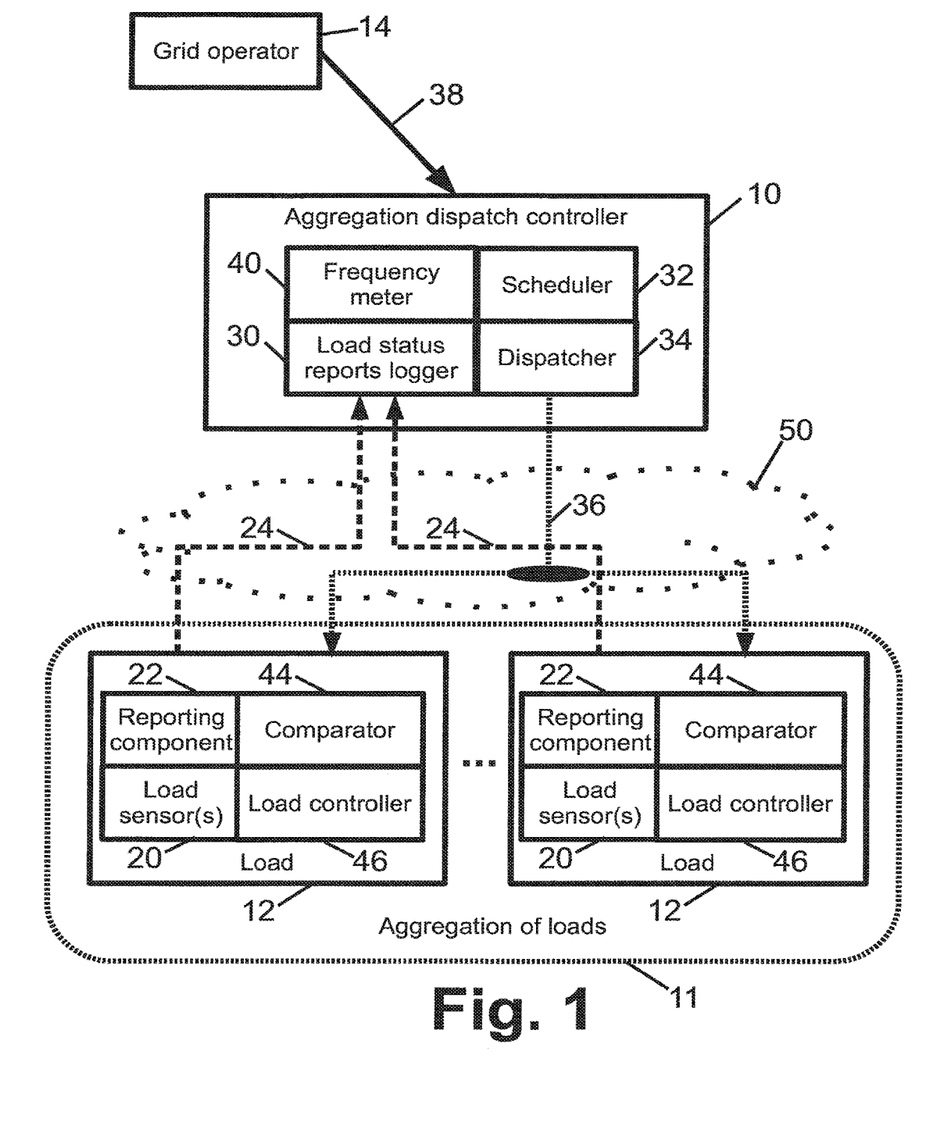
FIG. 1 diagrammatically shows a direct load control system comprising an aggregation of loads controlled by an aggregation dispatch controller.

With reference to FIG. 1, an aggregation dispatch controller 10 controls a population (i.e. aggregation 11) of electrical loads 12. The aggregation dispatch controller 10 interfaces with (or, in some embodiments, is a component of) the grid operator 14. The electrical loads (or devices) 12 are energy consuming devices with consumption flexibility. Some illustrative examples of flexible loads are thermal loads such as HVAC units or hot water heaters, and time-base loads such as dishwashers. Each load 12 performs state monitoring and provides periodic load status reports to the dispatch controller. As diagrammatically shown in FIG. 1, each load 12 includes one or more load sensors 20 for performing the state monitoring, and a reporting component 22 to perform the reporting function. The load sensors 20 may, for example, include a stored water temperature sensor and a water level sensor in the case of a hot water heater, a thermometer and so forth for a HVAC unit, a "ready" sensor for a dishwasher (indicating whether the dishwasher is loaded and hence "ready" to run), and so forth. The load sensor or sensors 20 for a given load 12 may optionally also include a user interface that enables (i.e. "senses") user inputs such as a temperature set point, flexibility parameters (e.g., a temperature range), constraints, overrides, or so forth. The reporting component 22 is a digital microprocessor or other electronic component that computes a load status report 24 in the form (n,KW) to be submitted by the load 12. The load status report 24 includes an urgency metric (n) indicating how critical it is for the load 12 to run in the next time interval, and a power draw level (kW) indicating how much power will be drawn by the load 12 during the next time interval if the load runs. Optionally, the load status report 24 may include constraints, e.g. an indication that the load must run (or cannot run) in the next time interval. Alternatively, such constraints can be built into the urgency metric, e.g. a value of "0" for the urgency metric (n) may indicate that the load cannot run in the next time interval, while a value of "100" for the urgency metric (n) may indicate that the load must run in the next time interval.

With continuing reference to FIG. 1, the aggregation dispatch controller 10 includes a load status reports logger 30 that logs the load status reports 24 received from the electrical loads 12 of the aggregation 11, and the optional load constraints. The dispatch controller 10 further includes a scheduler 32 and a dispatcher component 34 that compute and transmit, respectively, a single load dispatch signal ($S_{dispatch}$) 36 to all the electrical loads 12 of the aggregation 11. The dispatch signal ($S_{dispatch}$) 36 is the dispatch control point (or signal) and is computed by the scheduler 32 based on a baseline power expected to be drawn by the loads 12 of the aggregation 11 over the next time interval adjusted based on the Automatic Generation Control (AGC) signal 38 received from the grid operator 14 and/or other adjustments. The computation of the dispatch signal ($S_{dispatch}$) 36 takes into account the current operational electrical frequency as measured by a frequency meter 40 (as shown in FIG. 1) or as effectively represented by the AGC signal 38 or other indication of the need to add or shed load to maintain frequency stability. The dispatch controller 10 also optionally performs control and/or monitoring operations such as events monitoring to perform dispatch adjustments, and capacity monitoring and estimation. These optional operations enable the dispatch controller 10 to estimate the excess capacity available in the aggregation 11 of loads 12 for use in frequency control. This excess capacity may, in general, vary from time interval to time interval. For example, in the evening a large fraction of the dishwashers population may become unavailable for use in frequency control (i.e., are in a "must not run" state) as they are being loaded after the evening meal; whereas, a large fraction of the dishwashers population may become available for use in frequency control overnight as they are mostly loaded and ready to be run anytime overnight.

Figure 2:
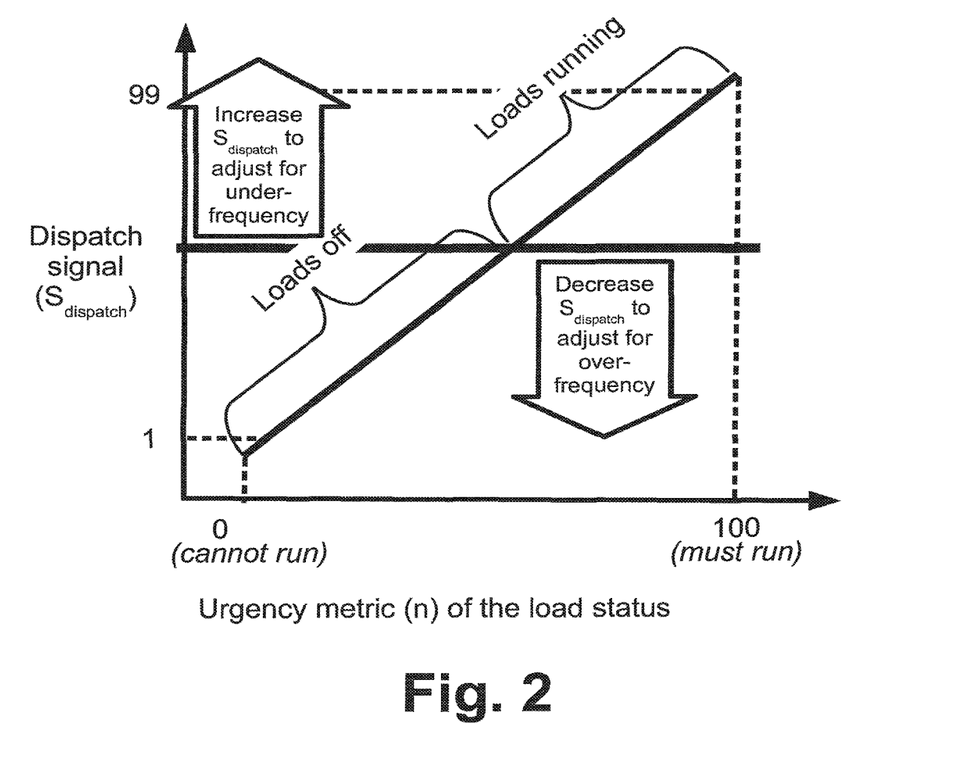
FIG. 2 diagrammatically plots the relationship between the dispatch signal ($S_{dispatch}$) generated by the aggregation dispatch controller and the urgency metric (n) of each load of the aggregation.

With continuing reference to FIG. 1 and with further reference to FIG. 2, the dispatcher component 34 of the aggregation dispatch controller 10 sends the dispatch signal ($S_{dispatch}$) 36 to each load 12 of the aggregation 11. Each electrical load 12 of the aggregation 11 further includes a comparator 44, which is an electronic component that compares the dispatch signal ($S_{dispatch}$) 26 with the urgency metric (n) of the load status. As diagrammatically shown in FIG. 2, if the urgency metric n is higher than the dispatch signal ($S_{dispatch}$) 36 then a load controller 46 of the load 12 runs the load 12 to draw power at the reported electrical draw level (kW) over the next time interval. On the other hand, if the urgency metric n is lower than the dispatch signal ($S_{dispatch}$) 36 then the load controller 46 of the load 12 does not run the load 12 and so no power is drawn. (The operational state over the next time interval for n=$S_{dispatch}$ can be either run or off, depending on the chosen configuration of the system).

A communication system 50 is provided to convey the load status reports 24 from the loads 12 to the dispatch controller 10, and to convey the dispatch signal ($S_{dispatch}$) 36 from the dispatch controller 10 to the loads 12. In FIG. 1, this communication system 50 is diagrammatically indicated by a dotted "cloud" indicating a wireless communication system, e.g. a cellular telephone network, WiFi, or the like. Additionally or alternatively, other communication systems can be employed, such as power line communication (PLC), e.g. broadband over power line (BPL), which may be a convenient communication pathway since the loads are all expected to be connected by electrical power lines. Various combinations are also contemplated, e.g. a WiFi feeding into a wired Ethernet into a cable network, et cetera.

The dispatch controller 10 is suitably embodied as a computer or other electronic data processing device. The functionality of the dispatch controller 10 may also be embodied as a non-transitory storage medium storing instructions executable by a computer or other electronic data processing device to perform the disclosed functions of the disclosed dispatch controller. The non-transitory storage medium may, for example, be a hard disk or other magnetic storage medium, an optical disk or other optical storage medium, random access memory (RAM), read-only memory (ROM), or other electronic storage medium, or so forth.

At the load end, the reporting component 22, the comparator 44, and the load controller 46 are suitably embodied as an electronic data processing device, for example a microcontroller or microprocessor and ancillary electronics (e.g., memory chip, power supply, et cetera) integrated with the load. In some embodiments, the electrical load 12 may initially include a programmable load controller that is retrofitted to modify its control based on the dispatch signal 36 as disclosed herein by modifying the load controller programming (e.g., via a firmware update) to perform the reporting and comparator functionality. The electrical loads 12 and the dispatch controller 10 also include suitable communication interfacing hardware (not explicitly indicated in FIG. 1) to send and receive the various signals, e.g. the load status reports 24 and the dispatch signal ($S_{dispatch}$) 36.

Some illustrative examples of the aggregative frequency control process performed by the system of FIG. 1 is now described.

Prior to the next time interval, each load 12 of the aggregation 11 performs a reporting operation that outputs the current load status report 24 for that load based on its current state prior to each time interval. This load status report 24 represents the current level of need for energy over the next time interval. The load status report 24 contains a state element (e.g., the urgency metric n) and a proposed power draw (i.e., the kW term of the status report). The state element or urgency metric (n) indicates how close the load is to its limit (either thermal or time) and the kW element indicates how much power (e.g., as measured in kilowatts) the load will consume during the next time interval if it runs. In the illustrative embodiment shown in FIG. 2, the state (i.e., urgency metric n) is on a scale from 0 to 100 inclusive, where 100 indicates fully discharged (that is, the load must run in the next time interval) and 0 indicates fully charged (that is, the load cannot run in the next time interval). Each electrical load 12 can also report its state as unavailable, which indicates that the load has been removed from the aggregation pool 11 for the time interval. (Alternatively, the "unavailable" state can be represented in this embodiment as an urgency metric value of "0" since this value ensures the load will not run in the next time interval. Additionally or alternatively, the unavailability can be indicated by setting the proposed power draw kW to zero).

The load status reports 24 are received by the reports logger 30 of the dispatch controller 10, and are optionally recorded in an archival record (not shown). The scheduler component 32 of the dispatch controller 10 then schedules the loads 12 for the next time interval, by selecting the appropriate dispatch signal ($S_{dispatch}$) 36. In one approach, all of the load reports 24 are ordered by their urgency metric (n) in an array (dispatch stack) so that the dispatch signal 36 can be chosen appropriately. In the illustrative example of FIG. 2, the dispatch signal ($S_{dispatch}$) 36 is in a range between 1 and 99 inclusive and will determine the number of loads 12 of the aggregation 11 that will be scheduled to be on or off as a baseline during the next time interval. A dispatch signal 36 of $S_{dispatch}=99$ will turn off the maximum number of loads, as all loads will be off except those loads with urgency n=100 (which must run). A dispatch signal 36 of $S_{dispatch}=1$ will turn on the maximum number of loads, as all loads will be on except those loads with urgency n=0 (which must be off). The urgency signal ($S_{dispatch}$) 36 is chosen to optimize the number of loads scheduled to be on or off during the next time period in order to achieve the desired aggregate load shedding or addition for frequency control based on the received AGC signal 38. As diagrammatically indicated in FIG. 2, the dispatch signal ($S_{dispatch}$) 36 is then suitably adjusted upward to respond to an under-frequency condition and/or AGC down signal, as this upward adjustment decreases the number of loads running in the next time interval in order to shed load. Conversely, as further diagrammatically indicated in FIG. 2, the dispatch signal ($S_{dispatch}$) 36 is suitably adjusted downward to respond to an over-frequency condition and/or AGC up signal, as this downward adjustment increases the number of loads running in the next time interval in order to add load. The precise value of the dispatch signal ($S_{dispatch}$) 36 takes into account the current electrical frequency (or a suitable surrogate value such as an AGC signal) and the values of the load status reports 24 including both the urgency values (n) and the load power levels (kW). The total load for a given dispatch signal ($S_{dispatch}$) 36 can be estimated as the sum of the reported power values (kW) for all loads whose urgency metric (n) is greater than (or greater than or equal to) the dispatch signal ($S_{dispatch}$) 36. Once the dispatch signal ($S_{dispatch}$) 36 is chosen, it is sent to all loads 12 of the aggregation 11 (that is, the same dispatch signal is sent to all loads of the aggregation). At each load 12, the comparator 46 determines whether its urgency value (n) is above or below the level of the dispatch signal 36 (that is, determines whether $n > S_{dispatch}$ or $n \geq S_{dispatch}$, depending on the choice of on or off for $n = S_{dispatch}$) and its load controller 46 turns the load on (at the reported kW level) or off according to this comparison. The duration of the "next time interval" is suitably chosen such that the states of the loads 12 will not change significantly during the period.

If the duration of the "next time interval" is longer than the desired time resolution of the frequency control, then the dispatch signal ($S_{dispatch}$) 36 may optionally be adjusted during the time interval to "fine-tune" the frequency control. For example, consider a "next time interval" that is of order minutes, and a desired frequency control resolution of order 2-4 seconds. In this variant, once the dispatch signal ($S_{dispatch}$) 36 is initially transmitted for the next time interval, the dispatch controller continues to receive updates of the AGC signal 38 every 2-4 seconds from the grid operator 14. (Or, alternatively, the readout of the frequency meter 40 continues to be sampled every 2-4 seconds). In response, the value of the dispatch signal ($S_{dispatch}$) 36 is adjusted from its current set point (that is, from the value sent at the beginning of the time interval), either higher or lower, in order to turn on or off the appropriate number of loads. In one approach, the increment (or decrement) of the dispatch signal 36 is $\Delta S_{dispatch}$. The amount of the adjustment is determined by summing up the KW of each load report 24 whose reported urgency metric value (n) is in the interval $\Delta S_{dispatch}$ immediately above (or below) the current value of the dispatch signal. Thus, the size of the increment $\Delta S_{dispatch}$ can be chosen to turn on (or off) the appropriate number of loads to achieve the requisite change in energy draw. In some embodiments, in order to meet an AGC ramp rate, the dispatch signal is adjusted proportionally over the time to meet the full ramp. For example, if there are 60 seconds to meet the full AGC request, the dispatch signal is adjusted by $\frac{1}{60}^{th}$ of the full change needed to meet the AGC request each second (or $\frac{1}{30}^{th}$ every 2 seconds if that is the control signal update interval, or so forth). The dispatch signal is updated at the appropriate frequency resolution interval (2-4 sec in this example) to maximize conformance with the AGC signal 38, e.g. to match the time period of the AGC update (which is 2-4 seconds in some electrical power grids in North America). As the AGC signal 38 changes, loads with a state that are closest to the original dispatch signal value will be turned on/off more often than those loads that are closer to the 0/100 state. In this case, these loads can be removed from the dispatch stack, either for the duration of the scheduling period, or for a shorter time that is appropriate to device constraints (e.g. a compressor can only be turned off/on every 10 minutes). This can also be accomplished by adjusting the original load status report urgency values up or down to indicate that the load has already received a dispatch signal that modified its original schedule for the period. That is, the load urgency state can be updated during the period if appropriate.

Post-dispatch load status adjustments are also contemplated. Some electrical loads may have limitations on the number of on/off events in a given time period, while others can be cycled on/off almost continuously. For loads with constraints, their status can be adjusted once they are dispatched to prevent subsequent selection and to allow for the minimum recovery/rest time period. This will allow for resource allocation over long time periods. Another application of this is that each load may submit subsequent load status reports that take the load out of the dispatch stack for future time periods, e.g. by setting n=0 (this could also occur within a time period, but would require intra-period load reporting updates).

The load aggregation 11 may comprise all loads 12 controlled by the dispatch controller, or alternatively the total load population may be divided into multiple groups (i.e. different aggregations 11) that are separately controlled. For example, due to the different operating characteristics of hot water tanks and of dishwashers, one aggregation may be hot water tanks, which are controlled by a dispatch signal $S_{dispatch,HWT}$ that is sent only to the hot water tanks, while another aggregation may be the dishwashers, which are controlled by a different dispatch signal $S_{dispatch,DW}$ that is sent only to the dishwashers. This can allow further tailoring of the dynamic and excess capacity characteristics of the overall load population for effective frequency control.

The disclosed approach reconciles the potentially divergent goals of frequency control and efficient individual device operation. The individual loads 12 provide their status reports 24 which succinctly report their operational status in terms of amount of power (kW) and urgency (n). The loads 24 operate autonomously, but take into account the level of the dispatch signal 36 to delay operation where such delay is acceptable from the standpoint of the load. Loads that urgently need to draw power do so, and inform the dispatch controller 10 of this condition by setting n to a high value, while loads that can wait to operate inform the dispatch controller 10 of this condition by setting n to a low value. The dispatch controller 10 chooses the level of the dispatch signal 36 to ensure a sufficient number of loads operate (or do not operate) to achieve the frequency control goal, while permitting the loads to continue to operate as needed.

In the illustrative embodiment, each load status report 24 includes an urgency value that may be above or below the value of the dispatch signal 36. If the urgency value is above the dispatch signal value ($n > S_{dispatch}$ or $n \geq S_{dispatch}$) then the device runs, while if the urgency value is below the dispatch signal value ($n \leq S_{dispatch}$ or $n < S_{dispatch}$) then the device does not run. More generally, the loads 12 submit status reports 24 including urgency values and power levels, the dispatch controller 10 analyzes these reports along with electrical frequency information (either direct frequency measurement or a surrogate such as AGC signal) and generates the dispatch signal 36, and each load 12 runs at its reported power level in the next time interval if its urgency value satisfies the dispatch signal 36. (The illustrative example in which the dispatch signal 36 is in the range 1-99 is merely an example. By way of a further illustrative example, in another embodiment the urgency values are integer values of 1-20 with "1" indicating must run and "20" indicating must not run, and the load runs in this embodiment if the urgency value reported by the load is lower than the dispatch signal value).

In the foregoing illustrative examples, each load 12 submits a status report 24 with a single (n,kW) pair. In alternative embodiments, it is contemplated for a single load to be permitted to submit two or more status reports with different urgency and proposed power levels. In this case, if both urgency values satisfy the dispatch signal then the load is run at the power of the status report with the lower urgency value (that is, the less urgent load status report). For example (using the urgency scaling of FIG. 2), a single load may submit a more urgent report of (80, 5 kW) and a less urgent report of (20, 10 kW) for the same next time interval. In this example, if $S_{dispatch}$ is above 80 then the load does not run in the next time interval. If $S_{dispatch}$ is less than 80 but greater than 20 then the load runs at the power level of the more urgent report (80, 5 kW), that is, at 5 kW in the next time interval. Finally, if $S_{dispatch}$ is less than 20 then the device runs at the power level of the report with lower urgency value, that is, at the second reported power level of 10 kW. The optional permitting of multiple status reports from the same load enables the load to ensure (or at least make more likely) that it runs at some lower power level (5 kW in this case) while having the opportunity to run at a higher power level (10 kW in this case) if doing so is advantageous for frequency regulation (as indicated by a suitably low dispatch signal value from the dispatch controller). Note that in the foregoing example a load can ensure some minimal operating power level $P_{min}$ by submitting a load status report ($100, P_{min}$) indicating that the load must draw at least a minimum power level of $P_{min}$. Allowing multiple load status reports with different urgency levels from the same load also allows for taking maximum advantage of loads with variable, controllable power levels, such as variable speed motors or compressors, for example.

Figure 3:
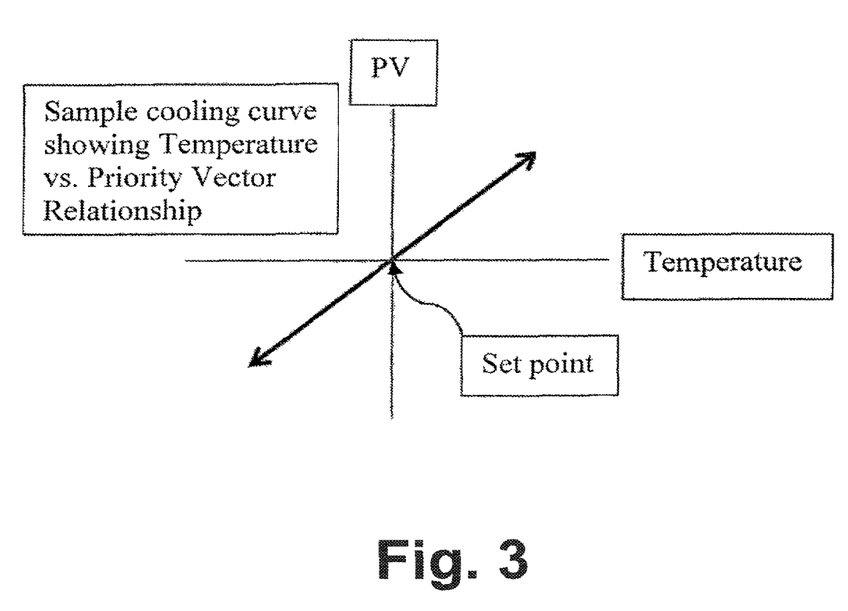
FIG. 3 diagrammatically plots a priority vector (PV) as a function of temperature for a thermostat-controlled device.

With reference to FIG. 3, this concept can also be extended over several time intervals, though the use of a priority vector. In this approach, each participating device within the aggregation 11 calculates its own Priority Vector (PV). The Priority Vector is a dimensionless value that represents the device's projected "need" for energy over the following time interval and possibly over subsequent time intervals. The elements of the PV are the urgency values (n) for each successive time interval in the time horizon of the PV. FIG. 3 plots the example of a thermostat programmed to maintain a cooling temperature of 72° F. will increase its PV as the temperature increases above the cooling set point. Each load 12 also provides its estimated amount of energy to be used in the next time interval, i.e. the kW term of the status report 12, in addition to its PV. The use of a PV in this embodiment to report the urgency for the load 12 enables the load to inform the aggregate dispatch controller 10 of its projected energy "need" over two or more successive time intervals. For instance if a process such as a dishwasher needs to run in the next 3 hours, it could have a low priority, i.e. low value of urgency, in the first hour (first element of the PV if the time interval is one hour), a medium priority in the second hour (second element of the PV), and then a 100% priority in the third hour. The 100% urgency value for the third element of the PV indicates it must run in the third hour if it did not run in the first two hours. The aggregate dispatch controller 10 then schedules the dishwasher to run accordingly in whichever hour is most beneficial, while obeying the constraint that the dishwasher must run at some point in the next three time intervals (hours)—this allows for multi-hour scheduling. Such multi-time period PV can be applied to other types of devices, such as thermal loads, as long as their time constants are longer than the bid periods. For example, consider an air conditioner which is N degrees below its maximum allowable room temperature, which (for the thermal inertia of the controlled room) translates into 3 time intervals until the room reaches that maximum allowable temperature if the air conditioner does not run. This air conditioner would report its status using a PV similarly to the dishwasher above so that it will be guaranteed to run before the room reaches the maximum allowable temperature, but only will run in period 1 or 2 if there is available capacity and other loads do not have higher priorities.

Note that while illustrative FIG. 3 shows a linear PV versus temperature characteristic, more generally the characteristic may be nonlinear, and furthermore the abscissa may be different, e.g. the PV of a dishwasher may be based on a given time interval (e.g. overnight) during which the dishwasher is scheduled to run.

The aggregate dispatch controller 10 performs supply and demand matching. The aggregate dispatch controller receives all status reports 24 (e.g., PV's and energy consumption predictions for each successive time interval within the time horizon of the PV) from each energy consuming load 12 in the aggregation 11, and assembles them in order of ascending urgency value (or priority vector). The aggregate dispatch controller also monitors factors such as wholesale price, capacity limits, congestion, or other supply limiting factors and creates a supply profile for varying levels of demand.

To facilitate multi-time period forecasting/scheduling, the supply side can also provide information on its requirements over several time intervals, using a format similar to the priority vectors described for the load status reports provided by the energy consuming devices. The supply-side vector can include attributes such as production capability and distribution constraints that may change dynamically (e.g. higher temperatures reduce transfer capacity).

In the illustrative embodiment of FIG. 1, the aggregation 11 is a "flat" aggregation. In a variant embodiment, aggregations can be arranged hierarchically, with one aggregation serving as an effective singular "energy consuming device" in an aggregation of higher level in the hierarchy. Multiple levels of aggregation, dispatch, and control, may be thusly constructed, with the constraints at each level being obeyed. For example, start at the highest level of aggregation and allocate across lower level aggregations (or "sub-aggregations"), treating each lower level aggregation as an effective singular device that submits a bid to the higher level aggregation dispatch controller. This can be repeated recursively down to the lowest level aggregations (i.e. "leaf aggregations" in analogy to a tree structure). As an example, a city may have a temporal constraint/need, and the city-wide aggregate dispatch controller allocates a certain load/response down to each neighborhood (a sub-aggregate), the neighborhoods may then allocate this level downward, while optionally imposing additional constraints at the neighborhood level, and passes downward to a street (circuit) aggregation level, and so forth, possibly terminating at "leaf" aggregations corresponding to buildings. It should be noted that in this arrangement the aggregate dispatch controllers at each level of the hierarchy are logically distinct, but the logically distinct aggregate dispatch controllers may optionally be implemented by a single computer (or other data processing device).

In general, the load 12 should run in the next time interval only if its urgency value satisfies the dispatch signal 36 output by the aggregation dispatch controller 10, and should not run in the next time interval if its urgency value does not satisfy the dispatch signal output. However, the loads 12 of the aggregation 11 are not directly controlled by the dispatch controller 10, and a load may run in variance with this condition under exceptional circumstances. For example, in the case of a dishwasher, the dishwasher may be programmed to begin running immediately if a human operator presses a "start" button on the dishwasher, regardless of the urgency status of the dishwasher and the dispatch signal value. (Another way of looking at this is as follows. When "start" is pressed, the load's urgency level immediately rises to 100, i.e. greater than whatever the dispatch signal level is, and hence immediately starts operating.) Similarly, a hot water tank may be programmed to begin heating immediately if the water flow out of the tank exceeds a threshold flow rate (thus indicating, for example, that someone is beginning to take a shower and draw hot water from the tank at a substantial rate). Safety interlocks may also define exceptional circumstances—for example, the hot water heater may be programmed to shut off immediately if the stored water temperature rises above a maximum threshold even if the dispatch signal and latest reported urgency value would indicate the hot water heater should continue to heat water.

Because the loads 12 remain under local control, and simply use the dispatch signal 36 from the dispatch controller 10 as an input value for the local load controller 44, 46, such operation at variance to the level of the dispatch signal 36 are readily accommodated. These exceptional circumstances under which the dispatch signal 36 is ignored are expected to occur infrequently, and respective to only a few loads of the aggregation 11 of loads over any given time interval, and so are not expected to significantly impact the overall power drawn by the aggregation 11. Thus, frequency control is not sacrificed by the occasional load 12 operating at variance to what would be expected given its reported status. In addition, the dispatch signal 36 can optionally be adjusted accordingly in response to such exceptional circumstances. This optional adjustment can be based simply on the variance in aggregate load or upon exception signals received directly from loads to indicate when they such events occur.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method comprising:
   at each electrical load of an aggregation of loads, generating a load status report using a microprocessor or microcontroller, the load status report comprising a power draw, a time interval expected to run, a current temperature, and an urgency value;
   at an aggregation dispatch controller, calculating a current amount of energy stored in accordance with each load status report;
   at the aggregation dispatch controller, generating a dispatch signal based on the generated load status reports, the current amount of energy stored in the electrical load of the aggregation of loads, and information indicative of electrical frequency;
   at the aggregation dispatch controller, transmitting a same dispatch signal to each of the electrical load of the aggregation;
   at each electrical load of the aggregation, comparing, via the microprocessor or microcontroller, the dispatch signal to the reported urgency value of the load to determine whether the reported urgency value satisfies the dispatch signal; and
   at each electrical load of the aggregation, operating the load at the reported power draw when the reported urgency value satisfies the dispatch signal and not operating the load at the reported power draw if the reported urgency value does not satisfy the dispatch signal,
   wherein an electrical load submits both a more urgent load status report and a less urgent load status report, and the operating at the electrical load comprises:
      operating the load at the power draw of the less urgent load status report if the urgency values of both the less urgent load status report and the more urgent load status report satisfies the dispatch signal,
      operating the load at the power draw of the more urgent load status report if the urgency value of the more urgent load status report satisfies the dispatch signal but the urgency value of the less urgent load status report does not satisfy the dispatch signal, and
      not operating the load at all if the urgency value of the less urgent load status report does not satisfy the dispatch signal and the urgency value of the more urgent load status report does not satisfy the dispatch signal.

2. The method of claim 1 wherein the information indicative of electrical frequency is one of an electrical frequency measurement and an Automatic Generation Control (AGC) signal.

3. The method of claim 1 wherein one of:
   (i) the urgency value satisfies the dispatch signal if the urgency value is higher than the dispatch signal value;
   (ii) the urgency value satisfies the dispatch signal if the urgency value is higher than or equal to the dispatch signal value;
   (iii) the urgency value satisfies the dispatch signal if the urgency value is lower than the dispatch signal value; and
   (iv) the urgency value satisfies the dispatch signal if the urgency value is lower than or equal to the dispatch signal value.

4. The method of claim 1 further comprising;
   modifying the load operation based on detection at the load of an exceptional condition.

5. The method of claim 1 wherein the operating is performed for a next time interval and the method further comprises:
during the next time interval, acquiring information indicative of electrical frequency at a time resolution finer than the duration of the next time interval; and
adjusting the dispatch signal during the next time interval based on the acquired information.

6. The method of claim 1 wherein the operating is performed for a next time interval and the method further comprises:
during the next time interval, acquiring information indicative of electrical frequency at a time resolution finer than the duration of the next time interval; and
adjusting at least some of the load status reports during the next time interval based on the acquired information.

7. The method of claim 1 further comprising:
at the dispatch controller, adjusting the dispatch signal in one direction to compensate for an under-frequency condition indicated by the information indicative of electrical frequency; or
at the dispatch controller, adjusting the dispatch signal in the opposite direction to compensate for an over-frequency condition indicated by the information indicative of electrical frequency.

8. The method of claim 1 further comprising:
at the dispatch controller, determining an available remaining capacity of each load responsive to the received status report; and
at the dispatch controller, generating the dispatch signal responsive to an aggregation of the remaining capacity of each load.

9. A system comprising:
an aggregation of electrical loads; and
a dispatch controller,
wherein each electrical load of an aggregation of loads is configured to generate a more urgent load status report and a less urgent status report using a microprocessor or microcontroller, each load status report comprising a power draw, a time interval expected to run, a current temperature, and an urgency value, and transmit each load status report to the dispatch controller,
wherein the dispatch controller is configured to calculate a current amount of energy stored in accordance with each load status report, and generate a dispatch signal based on the generated load status reports, the current amount of energy stored in electrical load of the aggregation of loads, and information indicative of electrical frequency, and transmit the same generated dispatch signal to the electrical loads of the population, and
wherein each electrical load of the aggregation of loads is configured to receive the dispatch signal from the dispatch controller, compare, via the microprocessor or microcontroller, the dispatch signal to the load's reported urgency value, and operate the electrical load at the reported power draw when the reported urgency value satisfies the dispatch signal, and
wherein the electrical load operates:
at the power draw of the less urgent load status report if the urgency values of both the less urgent load status report and the more urgent load status report satisfies the dispatch signal,
at the power draw of the more urgent load status report if the urgency value of the more urgent load status report satisfies the dispatch signal but the urgency value of the less urgent load status report does not satisfy the dispatch signal, and
does not operate the load at all if the urgency value of the less urgent load status report does not satisfy the dispatch signal and the urgency value of the more urgent load status report does not satisfy the dispatch signal.

10. The system of claim 9 further comprising:
said aggregation of electrical loads, each electrical load of the aggregation configured to:
not operate at the reported power draw if the urgency value does not satisfy the received dispatch signal.

11. The system of claim 10 wherein one of:
(i) the urgency value satisfies the dispatch signal if the urgency value is higher than the dispatch signal value;
(ii) the urgency value satisfies the dispatch signal if the urgency value is higher than or equal to the dispatch signal value;
(iii) the urgency value satisfies the dispatch signal if the urgency value is lower than the dispatch signal value; and
(iv) the urgency value satisfies the dispatch signal if the urgency value is lower than or equal to the dispatch signal value.

12. The system of claim 10 wherein an electrical load of the aggregation is configured to generate two or more load status reports with different urgency values and to operate at the reported power draw of the least urgent load status report whose urgency value satisfies the received dispatch signal or to not operate at all if none of the urgency values satisfy the received dispatch signal.

13. The system of claim 10 wherein:
an electrical load of the aggregation is configured to generate its load status report comprising a priority vector including two or more elements for a corresponding two or more successive time intervals wherein each element includes an urgency value for the corresponding time interval and a power draw for the corresponding time interval; and
the dispatch controller is configured to generate the dispatch signal based on the load status reports including the priority vector.

14. The system of claim 9 wherein the aggregation of electrical loads includes heating, ventilation, and air conditioning (HVAC) units.

15. The system of claim 9 wherein the aggregation of electrical loads includes hot water tanks.

16. The system of claim 9 wherein the aggregation of electrical loads includes dishwashers.

17. The system of claim 9 wherein the aggregation of electrical loads includes residential electrical loads.

18. The system of claim 9 wherein the information indicative of electrical frequency is one of an electrical frequency measurement and an Automated Generation Control (AGC) signal.

19. The system of claim 9, wherein the dispatch controller determines an available remaining capacity of each load responsive to the received status report, wherein the dispatch signal is generated responsive to an aggregation of the remaining capacity of each load.

20. The system of claim 9 wherein the dispatch controller generates and transmits the dispatch signal for each successive time interval, and is further configured to:
during each time interval, acquire information indicative of electrical frequency at a time resolution finer than the duration of the time interval; and
adjust the dispatch signal during the time interval based on the acquired information.

21. The system of claim 9 wherein the dispatch controller is configured to:
- adjust the dispatch signal in one direction to compensate for an under-frequency condition indicated by the information indicative of electrical frequency; and
- adjust the dispatch signal in the opposite direction to compensate for an over-frequency condition indicated by the information indicative of electrical frequency.

22. The system of claim 9 wherein the dispatch controller is configured to:
- adjust the dispatch signal to compensate for at least one supply limiting factor, wherein the at least one supply limiting factor is selected from the group comprising unexpected load swings, weather changes, social events, wholesale price, capacity limits, or congestions.

23. The system of claim 22, wherein the dispatch controller is configured to adjust the dispatch signal to compensate for a sub-aggregation constraint.

24. The system of claim 23 wherein the electronics of each energy consuming load of the aggregation is further configured to update the state of its status report over the next time interval.

25. A system comprising:
- an aggregation of energy consuming loads wherein each energy consuming load of the aggregation includes electronics configured to generate a status report comprising a state indicating urgency, a time interval expected to run, a current temperature, and a consumption power value;
- an aggregate dispatch controller comprising a computer configured to receive the status reports of the energy consuming loads of the aggregation, to calculate a current amount of energy stored in accordance with each load status report, and to compute an initial dispatch signal for a next time interval responsive to the current amount of energy stored, and to transmit the initial dispatch signal to the energy consuming loads of the aggregation;
- wherein the electronics of each energy consuming load of the aggregation further decides whether to operate the energy consuming load over the next time interval at the consumption power value of its status report based on comparison of its state with the same initial dispatch signal; and
- wherein the aggregate dispatch controller is further configured to update the dispatch signal over the next time interval based on information acquired over the next time interval and to transmit the updated dispatch signal to the energy consuming loads of the aggregation, the electronics of each energy consuming load of the aggregation updating the decision to operate the energy consuming load over the next time interval at the consumption power value of its status report as a function of time based on comparison of the updated dispatch signal with its state,
- wherein the electronics of each energy consuming load submits both a more urgent load status report and a less urgent load status report, and the electronics of the energy consuming load decides to:
  - operate the energy consuming load at the consumption power level of the less urgent load status report if the urgency values of both the less urgent load status report and the more urgent load status report satisfies the dispatch signal,
  - operate the energy consuming load at the consumption power level of the more urgent load status report if the urgency value of the more urgent load status report satisfies the dispatch signal but the urgency value of the less urgent load status report does not satisfy the dispatch signal, and
  - not operate the energy consuming load at all if the urgency value of the less urgent load status report does not satisfy the dispatch signal and the urgency value of the more urgent load status report does not satisfy the dispatch signal.

26. The system of claim 25 wherein the electronics of each energy consuming load are configured to generate the status report comprising a priority vector indicating its urgency as a function of time over a contiguous set of successive time intervals including the next time interval and at least one time interval after the next time interval.

27. The system of claim 26 wherein the priority vector includes a state element for each successive time interval.

* * * * *